United States Patent
Goldberg et al.

(10) Patent No.: US 9,310,182 B2
(45) Date of Patent: Apr. 12, 2016

(54) SPECTRAL FILTERING OF K-CLOCK SIGNAL IN OCT SYSTEM AND METHOD

(71) Applicant: Axsun Technologies LLC, Billerica, MA (US)

(72) Inventors: Brian Goldberg, Wellesley, MA (US); Bartley C. Johnson, North Andover, MA (US)

(73) Assignee: Axsun Technologies LLC, Billerica, MA (US)

( * ) Notice: Subject to any disclaimer, the term of this patent is extended or adjusted under 35 U.S.C. 154(b) by 277 days.

(21) Appl. No.: 14/143,303

(22) Filed: Dec. 30, 2013

(65) Prior Publication Data

US 2015/0184995 A1    Jul. 2, 2015

(51) Int. Cl.
G01B 9/02 (2006.01)

(52) U.S. Cl.
CPC ........ G01B 9/02004 (2013.01); G01B 9/02069 (2013.01); G01B 9/02091 (2013.01)

(58) Field of Classification Search
CPC ........... G01B 9/02004; G01B 9/02091; G01B 9/02069
See application file for complete search history.

(56) References Cited

U.S. PATENT DOCUMENTS

| | | | |
|---|---|---|---|
| 7,415,049 B2 | 8/2008 | Flanders et al. |
| 8,139,226 B2 | 3/2012 | Johnson |
| 8,526,472 B2 | 9/2013 | Flanders et al. |
| 8,564,783 B2 | 10/2013 | Flanders et al. |
| 2010/0272432 A1 | 10/2010 | Johnson |
| 2011/0255095 A1 | 10/2011 | Jiang et al. |
| 2012/0013914 A1 | 1/2012 | Kemp et al. |
| 2013/0271772 A1 | 10/2013 | Johnson et al. |

FOREIGN PATENT DOCUMENTS

| | | |
|---|---|---|
| WO | 2008089393 A2 | 7/2008 |
| WO | 2008151155 A2 | 12/2008 |

OTHER PUBLICATIONS

Schuman, Joel S., "Spectral Domain Optical Coherence Tomography for Glaucoma (An AOS Thesis)," Transactions of the American Opthalmological Society, vol. 106, Dec. 2008, pp. 426-458.

Li, Jian, et al., "Scalable, High Performance Fourier Domain Optical Coherence Tomography: Why FPGAs and Not GPGPUs," FCCM '11 Proceedings of the 2011 IEEE 19th Annual International Symposium on Field-Programmable Custom Computing Machines, 2011, pp. 49-56.

Desjardins, Adrien E., et al., "Real-Time FPGA Processing for High-Speed Optical Frequency Domain Imaging," IEEE Trans Med Imaging, vol. 28, No. 9., Sep. 2009, pp. 1468-1472.

*Primary Examiner* — Hwa Lee
(74) *Attorney, Agent, or Firm* — HoustonHogle, LLP

(57) ABSTRACT

A system and method for spectral filtering of a k-clock signal in a swept-source Optical Coherence Tomography ("OCT") system to remove artifacts in the k-clock signal. The system synchronizes sampling of the k-clock and interference signals generated from scanning a sample. Using a filtered k-clock signal, the system resamples an interference dataset of the interference signals. The system then performs Fourier transform based processing upon the resampled interference dataset to yield axial depth images of the sample. The system preferably performs the reconstruction, resampling, and associated Fourier-Domain signal processing in software via a Field Programmable Gate Array ("FPGA") of a rendering system.

20 Claims, 7 Drawing Sheets

SPECTRAL FILTERING OF K-CLOCK SIGNAL IN OCT SYSTEM AND METHOD

BACKGROUND OF THE INVENTION

Optical coherence analysis and specifically optical coherence tomography ("OCT") are becoming increasingly popular in research and clinical settings. OCT provides high-resolution, non-invasive imaging of sub-surface features of a sample. These characteristics enable such applications as industrial inspection and in vivo analysis of biological tissues and organs.

A common OCT technique is termed Fourier domain OCT ("FD-OCT,") of which there are generally two types: Spectral Domain OCT and Swept Source OCT. In both systems, optical waves are reflected from an object or sample. These waves are referred to as OCT interference signals, or simply as interference signals. A computer produces images of two-dimensional cross sections or three-dimensional volume renderings of the sample by using information on how the waves are changed upon reflection. Spectral Domain OCT and Swept Source OCT systems differ, however, in the type of optical source that they each utilize and how the interference signals are detected.

Spectral Domain OCT systems utilize a broadband optical source and a spectrally resolving detector system to determine the different spectral components in a single axial scan ("A-scan") of the sample. Thus, spectral Domain OCT systems usually decode the spectral components of an interference signal by spatial separation. As a result, the detector system is typically complex, as it must detect the wavelengths of all optical signals in the scan range simultaneously, and then convert them to a corresponding interference dataset. This affects the speed and performance of Spectral Domain OCT systems.

In contrast, Swept Source OCT systems encode spectral components in time, not by spatial separation. Swept Source OCT systems typically utilize wavelength (frequency) swept sources that "sweep" in the scan range. The interference signals are then typically detected by a non spectrally resolving detector or specifically a balanced detector system.

Compared to Spectral Domain OCT technology, Swept Source OCT often does not suffer from inherent sensitivity degradation at longer imaging depths, provides faster scanning speed and improved signal to noise ratio ("SNR,"), and reduces the complexity of the detector system.

Swept Source OCT systems often utilize a sampling clock, or k-clock, that is used in the sampling of the interference signals. The k-clock is typically generated by a k-clock module that generates a signal that indicates every time the swept source tunes through a predetermined frequency increment of the scan band.

Some Swept Source OCT systems use a hardware-based k-clocking to directly clock the Analog-to-Digital ("A/D") converter of a Data Acquisition ("DAQ") system for sampling the interference signals. Other Swept Source OCT systems sample the k-clock signals from the k-clock module in the same manner as the interference signal, creating a k-clock dataset of all sampled k-clock signals and an interference dataset of all sampled interference signals. Then, the k-clock dataset is used to resample the interference dataset. This is known as a software-based k-clocking Swept Source OCT systems typically require this resampling or k-clock control of the interference sampling to compensate for instabilities and/or non-linearities in the tuning of the swept sources in frequency. The use of the k-clock yields interference data that are evenly spaced in the optical frequency domain, or k-space, which provides maximal SNR and axial imaging resolution for subsequent Fourier transform-based signal processing upon the acquired interference signal spectra, or interference dataset. The Fourier transform provides the "A-scan" information, or axial scan depth profile within the sample.

Because of the potentially high processing overhead that resampling of interference datasets and Fourier transform-based signal processing can incur, manufacturers of FD-OCT systems are increasingly turning to special-purpose processing units such as Field-Programmable Gate Arrays ("FPGA"), and General-Purpose Graphical Processing Units ("GPGPU," or "GPU"). For more information, see "Scalable, High Performance Fourier Domain Optical Coherence Tomography: Why FPGAs and Not GPGPUs," Jian Li, Marinko V. Sarunic, Lesley Shannon, School of Engineering Science, Simon Fraser University, Burnaby BC, Canada. Proceedings of the 2011 IEEE 19th Annual International Symposium on Field-Programmable Custom Computing Machines, FCCM '11, 2011.

SUMMARY OF THE INVENTION

In general, the optical systems of OCT systems must be carefully designed and manufactured to maximize performance. The interferometers used in OCT systems are designed to measure subtle refractive index changes in the sample. As result, spurious reflections within the interferometers or the swept sources, or the coupling between the interferometers and swept sources, can result in artifacts in the images generated by the OCT systems.

Interestingly, another source of artifacts arises from the k-clock modules. Often, these modules are constructed from interferometers or etalons that are used to track the frequency scanning of the swept sources. Spurious reflections in these optical systems arising from imperfect fiber splicing or reflections from components in free space portions within the modules cause the k-clock signal to imperfectly track the frequency scanning of the swept optical signal from the swept source. These effects can also lead to artifacts in the OCT images.

Aspects of the present invention are directed to a swept source OCT system and method that remove image artifacts. The invention performs spectral filtering of the sampled k-clock signal to create a reconstructed k-clock. Then, using the software-based k-clock method, the system uses the reconstructed k-clock signal to resample the acquired interference signal, creating a linearized interference dataset, which will yield reduced artifacts in the final OCT images.

This system provides several advantages. The system can be used to optimize OCT systems based on known imperfections in their optical systems, and particularly the k-clock modules and also optimize individual systems due to manufacturing differences from system to system.

In general according to one aspect, the invention features an optical coherence analysis system. The system comprises an optical swept source system that generates a swept optical signal, a k-clock module that generates k-clock signals in response to frequency sweeping of the swept optical signal, an interferometer that generates interference signals from the swept optical signal, and a data acquisition system that samples the k-clock signals and the interference signals to generate a k-clock dataset and an interference dataset. According to the invention, a rendering system is further provided that spectrally filters the k-clock dataset into a reconstructed k-clock dataset, and resamples the interference dataset into a linearized interference dataset in response to the reconstructed k-clock dataset.

In embodiments, the rendering system resamples the reconstructed k-clock dataset into a resampled k-clock dataset, and wherein the rendering system resamples the interference dataset into the linearized interference dataset in response to the resampled k-clock dataset. Currently, the rendering system comprises a field-programmable gate array that implements a spectral filter for converting the k-clock dataset into the reconstructed k-clock dataset. In particular, the rendering system spectrally filters the k-clock dataset by bandpass filtering the k-clock dataset to suppress artifacts using a k-clock bandpass spectral window for creating the reconstructed k-clock dataset. The k-clock bandpass window is bounded by a lower frequency value of the k-clock dataset and an upper frequency value of the k-clock dataset. In one example, the k-clock bandpass window is bounded by a frequency value of a lower sideband of the k-clock dataset and a frequency value of an upper sideband of the k-clock dataset.

In the illustrated embodiment, the rendering system spectrally filters the k-clock dataset by performing a Fourier transform upon the k-clock dataset and performing an inverse Fourier transform to create the reconstructed k-clock dataset. The rendering system applies values of a bandpass function to frequency values outside of a k-clock bandpass filter window prior to performing the inverse Fourier transform. For example, the rendering system applies zeros to frequency values outside of a k-clock bandpass filter window prior to performing the inverse Fourier transform.

In general according to one aspect, the invention features an optical coherence analysis method. The method comprises generating a swept optical signal, generating k-clock signals in response to frequency sweeping of the swept optical signal, generating interference signals from the swept optical signal, sampling the k-clock signals and the interference signals to generate a k-clock dataset and an interference dataset and spectrally filtering the k-clock dataset into a reconstructed k-clock dataset, and the resampling the interference dataset into a linearized interference dataset in response to the reconstructed k-clock dataset.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms of the articles "a", "an" and "the" are intended to include the plural forms as well, unless expressly stated otherwise. It will be further understood that the terms such as includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element is referred to and/or shown as being connected or coupled to another element, it can be directly connected or coupled to the other element or intervening elements may be present.

Figure 1:
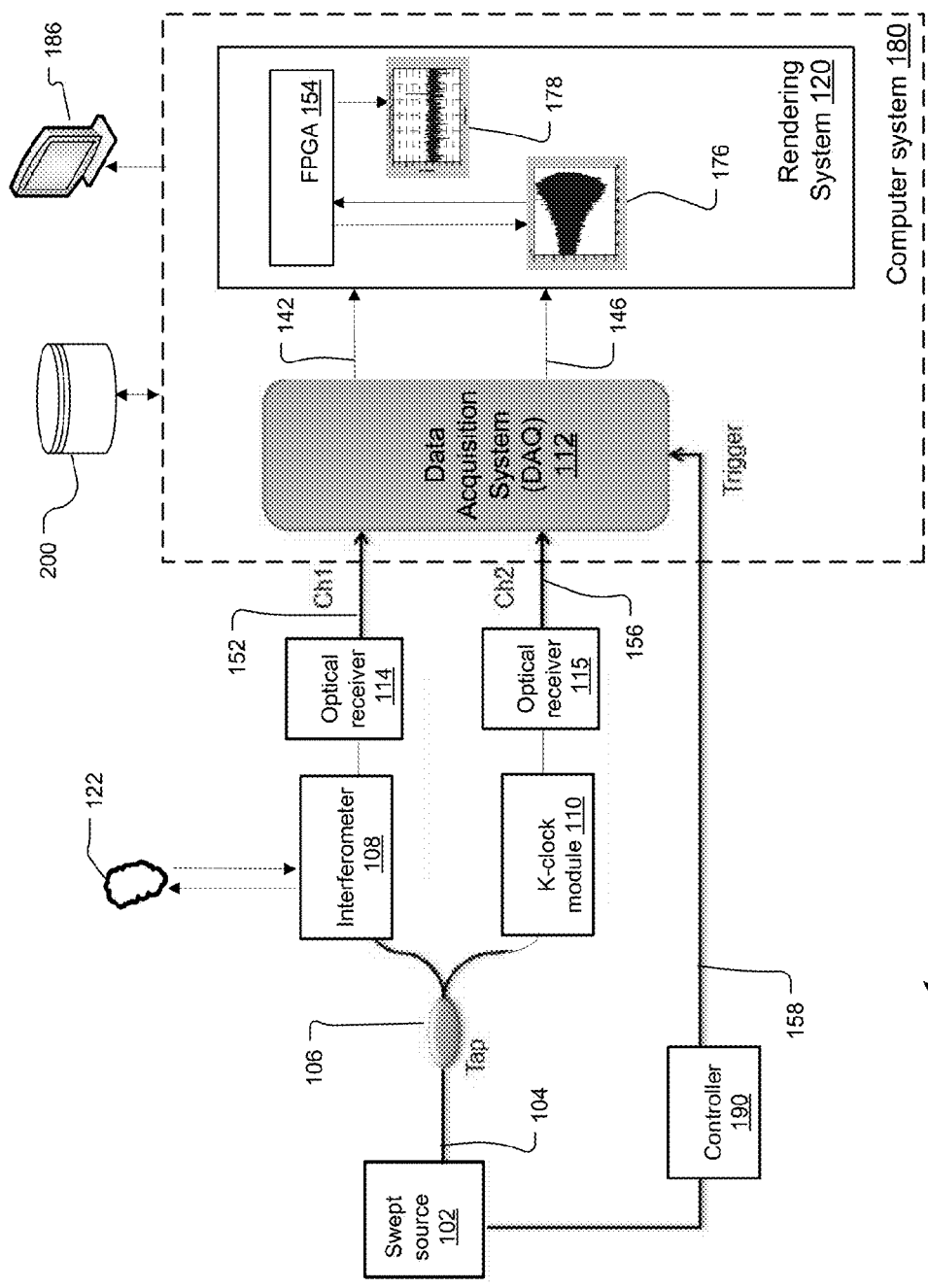
FIG. 1 is a schematic block diagram of an optical coherence analysis system.

FIG. 1 shows a swept-source OCT system 100 to which the present invention is applicable. The OCT system uses a swept source 102 to generate swept optical signals on optical fiber 104. The swept source 102 is typically a tunable laser designed to sweep across a broad optical wavelength range. The swept optical signals are scanned, or "swept," over a spectral scan band. Each sweep of the swept source 102 scans narrowband emission over the scan band.

A tunable laser is constructed from a gain element, such as a semiconductor optical amplifier ("SOA") that is located within a resonant laser cavity, and a tuning element such as a rotating grating, a grating with a rotating mirror, or a Fabry-Perot tunable filter.

Currently, some of the highest speed tunable lasers are based on the laser designs described in U.S. Pat. No. 7,415, 049 B1, entitled "Laser with Tilted Multi Spatial Mode Resonator Tuning Element," by D. Flanders, M. Kuznetsov and W. Atia, which is incorporated herein by this reference in its entirety.

Another technology for high-speed swept sources is termed tunable amplified spontaneous emission (ASE) sources. An example of an ASE swept source is described in U.S. Pat. No. 8,526,472 B1, "ASE Swept Source with Self-Tracking Filter for OCT Medical Imaging," by D. Flanders, M. Kuznetsov and W. Atia, which is incorporated herein by this reference in its entirety.

A fiber coupler 106 or other optical splitter transmits a portion of the swept optical signal to an OCT interferometer 108 and a k-clock module 110. In alternate embodiments, the swept optical signal could be transmitted in free space, or as part of an integrated system that includes the swept source 102, interferometer 108, and the k-clock module 110.

A controller 190 controls the swept source 102 using a source control signal that configures the swept source 102 to scan over the scan band. The controller 190 also controls a Data Acquisition System ("DAQ") 112.

In the current embodiment, the interferometer 108 is a Mach-Zehnder-type that sends optical signals to a sample 122, analyzes the optical signals reflected from sample 122, and generates an interference signal in response.

In the illustrated embodiment, the optical interference signal generated by the sample interferometer 108 is detected by a sample optical receiver 114. The optical receiver 114 converts the optical interference signal into an electronic interference signal 152. In the preferred embodiment, the sample optical receiver 114 is a balanced detector system, which generates the electronic interference signal 152.

The k-clock module 110 generates optical k-clock signals at equally spaced optical frequency sampling intervals as the swept optical signal is tuned or swept over the scan band. Optical receiver 115 detects the optical signal generated by the k-clock module 110, and converts the optical signal into electronic k-clock signals 156. The electronic k-clock signals 156 are used by the data acquisition system 112 to track the frequency tuning of the optical swept source 102.

In some embodiments, the k-clock module 110 is implemented as a Michelson interferometer. These generate a sinusoidal response to the frequency scanning of the swept optical signal. In specific implementations, a fiber Michelson interferometer is used.

In other embodiments, etalons are used in the k-clock module 110 to filter the swept optical signal. An example of a clock integrated with a swept source laser is described in U.S. Pat. No. 8,564,783 B2 "Optical Coherence Tomography Laser with Integrated Clock," by D. Flanders, W. Atia, B. Johnson, M. Kuznetsov, and C. Melendez, which is incorporated herein by this reference in its entirety.

The DAQ 112 accepts the electronic interference signals 152 and the electronic k-clock signals 156 on input channels CH1, CH2, respectively. The DAQ 112 also accepts a sweep trigger signal 158 indicating the start of the sweeps of the swept source 102.

Based on an initial signal sampling rate, the DAQ 112 performs analog to digital conversion to sample the electronic k-clock signals 156 and electronic interference signals 152 for the scan band into a k-clock dataset 146 and interference dataset 142, respectively. A rendering system 120 accepts the k-clock dataset 146 and interference dataset 142 as inputs, and performs operations upon the datasets to create interferometric depth scans of the sample.

Preferably, the DAQ 112 and the rendering system 120 are included within a computer system 180, and reside in one or more modular cards of the computer system 180. The DAQ 112 and the rendering system 120 perform memory intensive and computationally intensive signal processing operations. The rendering system 120 can additionally perform image processing operations.

In embodiments, the DAQ 112 and the rendering system 120 utilize dedicated processors and/or local memory buffers to assist with their signal processing activities. This offloads the processing burden from the main processor of the computer system 180. The usage of modular processing boards for the DAQ 112 and the rendering system 120 can also extend the capabilities of the swept-source system 100 by optionally accepting additional processing boards.

In the preferred embodiment, the rendering system 120 includes one or more FPGAs 154 and associated support peripherals for performing signal processing and/or image processing operations upon the k-clock dataset 146 and interference dataset 142. The rendering system 120 also interacts with a media storage device 200 for saving and retrieving information for the OCT system 100, and displays information to display screen 186.

At a very coarse level of operation, the interference dataset 142 provides the spectral response generated from the frequency tuning of the optical swept source 102 upon the sample 122. The rendering system 120 then creates a reconstructed k-clock dataset 176 from the k-clock dataset 146 by spectral filtering. The rendering system 120 then uses the reconstructed k-clock dataset 176 to resample the interference dataset 142 into a linearized interference dataset 178. Then, the rendering system 120 performs Fourier transform based processing upon the linearized interference dataset 178 to create A-scan depth information 174 for the sample 122 for each frequency sweep of the swept source. The rendering system 120 then combines or "stacks" the A-scans 174 to form three-dimensional tomographic datasets of the sample 122 for viewing on the display device 186, or storing to the media storage device 200, such as a database, for future analysis.

However, if used without being preprocessed, the interference dataset 142 and the k-clock dataset 146 will typically result in image artifacts introduced by the swept source 102, sample interferometer 108 and k-clock module 110. Image artifacts are typically caused by spurious reflections within the swept source 102, such as intracavity reflections within the swept source 102, sample interferometer 108 and k-clock module 110.

In addition, there can also be jitter in the tuning of the swept source, which is reflected in the k-clock. Because the artifacts can affect the quality of the information obtained from the interference data, minimizing or eliminating the artifacts is an important consideration in OCT systems 100.

To address these issues, a filtering step is performed upon the k-clock dataset 146 to spectrally filter the k-clock dataset 146 to reduce or eliminate the image artifacts. The OCT system then utilizes this spectrally filtered k-clock dataset 146 to resample the interference dataset 142.

Figure 2:
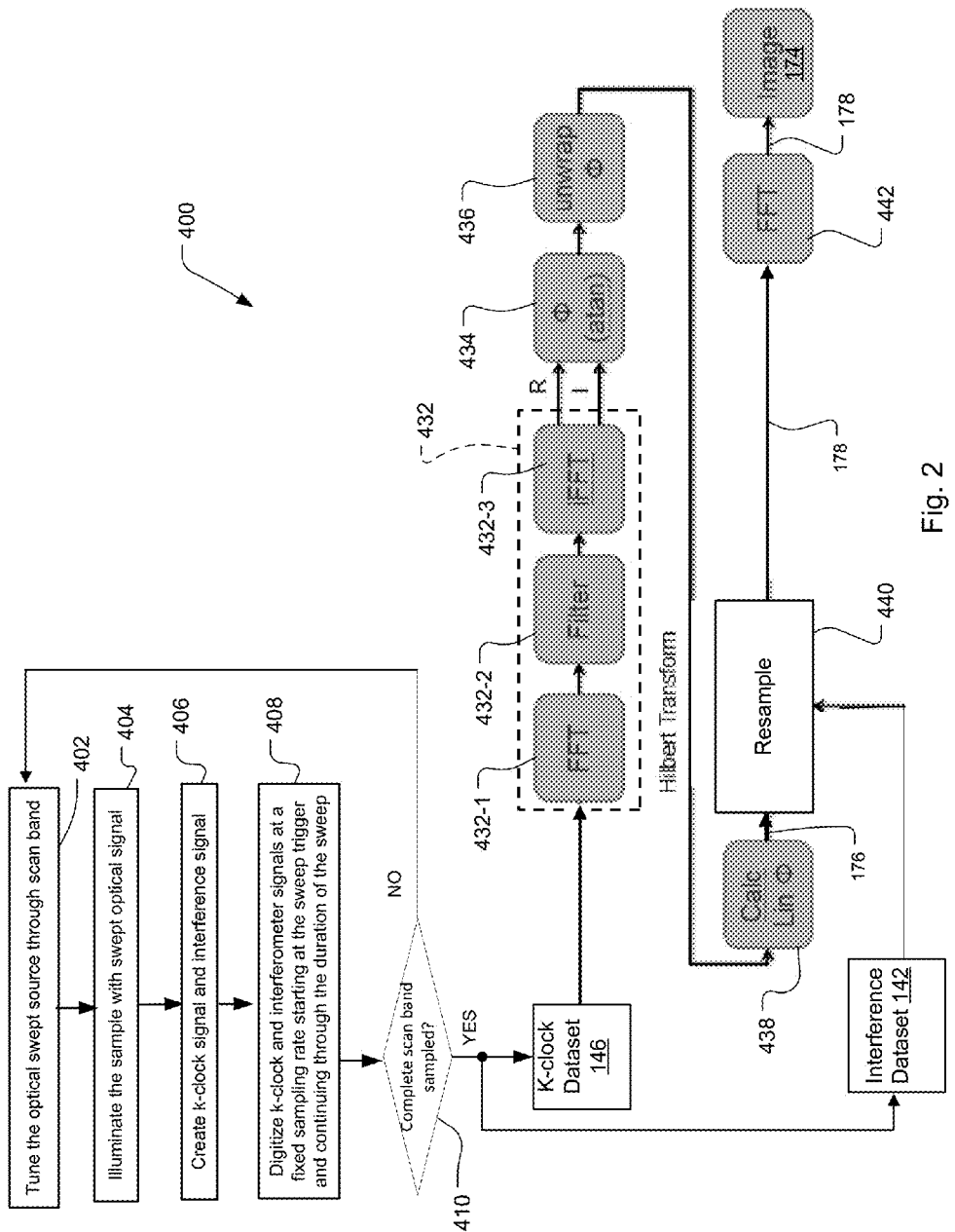
FIG. 2 is a block diagram of a method for creating interferometric depth profiles, or Axial profiles (A-scans) of a sample from interference datasets including software filtering of a sampled k-clock signal.

FIG. 2 shows a block diagram of method 400 for creating image artifact-reduced interferometric depth profiles of a sample by spectrally filtering the k-clock dataset 146.

In more detail, in step 402, the controller 190 tunes the optical swept source 102 through the scan band. In step 404, the swept optical signal generated by the swept source 102 illuminates the sample 122.

In step 406, for the current swept optical signal, optical receiver 114 accepts input from the interferometer 108 that generates an interference signal 152. In a similar fashion, optical receiver 115 accepts input from the k-clock module 110 that generates a k-clock signal 156. According to step 408, the DAQ 112 digitizes the k-clock signal 156 and the interference signal 152 at a fixed sampling rate, starting at the sweep trigger 158 and continuing through the duration of the sweep. This is accomplished by the transitioning of the method 400 transitions to step 410 to check if the signals for all frequencies in the scan band have been sampled. If the sampling is not complete, the method 400 transitions back to step 402 to tune the optical source to the next frequency in the scan band, until an entire A-scan dataset is generated. Otherwise, the scanning of the sample 122 and sampling of its k-clock signals 156 and interference signals 152 is complete.

Upon completion of step 410, the method 400 creates the k-clock dataset 146 from the sampled k-clock signals 156 and the interference dataset 142 from the sampled interference signals 152.

The remaining steps are associated with signal processing that the rendering system 120 performs upon the k-clock dataset 146 and the interference dataset 142.

First, in step 432-1, the rendering system 120 performs a Fourier transform-based Fast Fourier Transform (FFT) upon the k-clock dataset 146, applies the spectral filter 432-2 by applying zeros to every other FFT value. The filter that is applied is the bandpass filter that has a passband and center frequency that are determined in a calibration process described below.

An Inverse Fast Fourier Transform (IFFT) is then applied in step 432-3 to the result. This separates the k-clock dataset 146 into a complex-valued signal of real and imaginary components that form a Hilbert transform pair.

Then, in step 434, linear phase angle information is extracted from the real component of the k-clock dataset 146. In step 436, the linear phase angle information is unwrapped into a continuous signal, rather than one with $2\pi$ phase jumps. In step 438, the rendering system 120 further calculates non-integer k-values that characterize non-linearities in the frequency tuning of the optical signals over the scan band. The result is a reconstructed k-clock dataset 176 with samples linearly spaced in frequency that can be utilized to resample the interference dataset 142 at a desired sampling rate associated with imaging depth of the sample 122.

Using the reconstructed k-clock dataset 176 as a sampling clock, the rendering system 120 then resamples, in step 440, the interference dataset 142 into a linearized interference dataset 178. The rendering system 120 samples the interference dataset 142 at the same signal sampling rate that the DAQ 112 utilized when sampling the k-clock signals 156 and the interference signals 152. Using the same signal sampling rate for resampling the interference dataset 142 enables the maximum possible A-scan depth information of the sample 122 to be extracted from the linearized interference dataset 178.

In step 442, the rendering system then performs a Fourier transform based FFT upon the resampled or linearized interference dataset 178 to create the axial depth images 174 of the sample 122.

In the preferred embodiment, FIG. 2 steps 432 through 442, inclusive, are performed by one or more FPGAs 154 of the rendering system 120.

Figure 3:
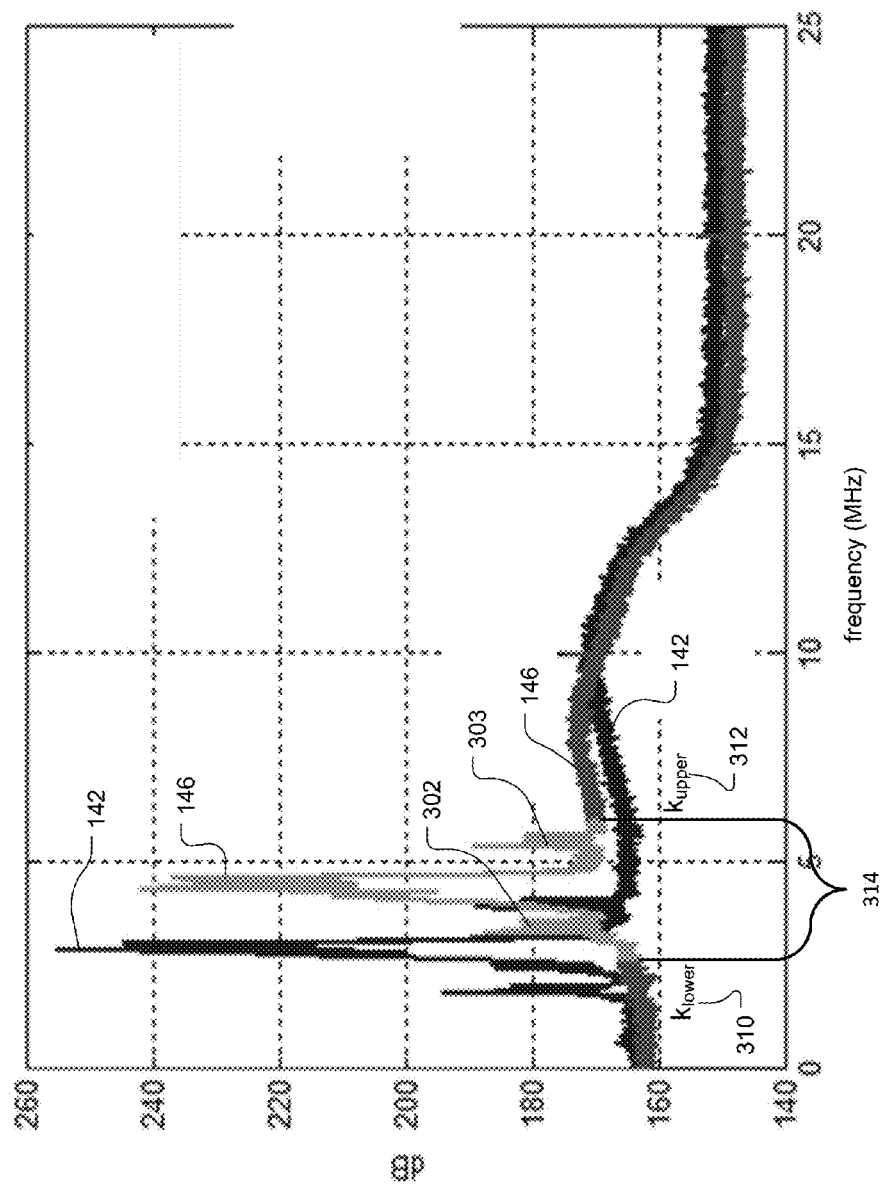
FIG. 3 is an intensity vs. optical frequency plot of both a k-clock dataset and an interference dataset that include sideband image artifacts, and illustrates optimal selection of a k-clock bandpass window upon the k-clock dataset for spectrally filtering the k-clock dataset.

FIG. 3 shows an exemplary k-clock dataset 146 and interference dataset 142 created by the OCT system 100 for a specific sample 122. Each dataset includes artifacts, as one example of features that can give rise to image artifacts that an operator would likely target for elimination. On the other hand, experimentation has shown that it is desirable to preserve lower sideband 302 and an upper sideband 303. The operator selects a k-clock bandpass window 314 within the k-clock dataset 146 for eliminating the artifacts but preserving the sidebands. The k-clock bandpass window 314 is bounded by frequencies $k_{lower}$ 310 and $k_{upper}$ 312. In the preferred embodiment, as the name implies, the k-clock bandpass window 314 defines the frequency range of values that the rendering system 120 utilizes for bandpass filtering the k-clock dataset 146.

Figure 4:
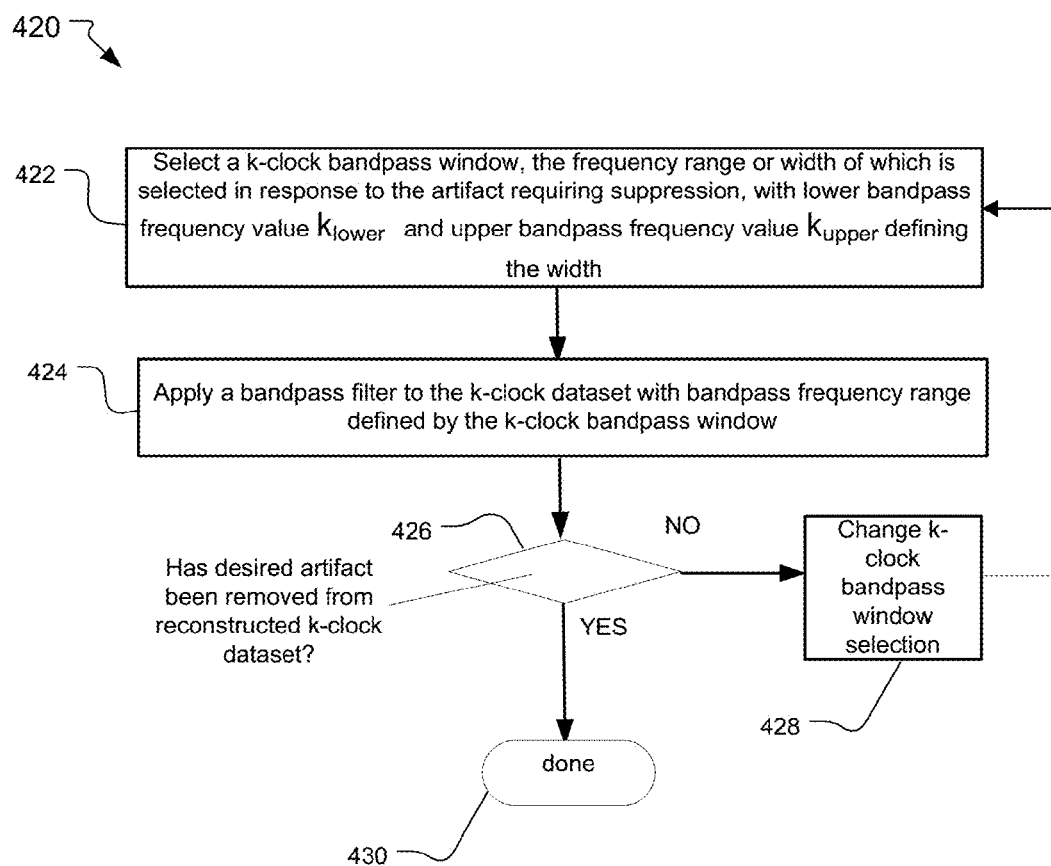
FIG. 4 shows a flow diagram of a calibration step for setting the center frequency and passband for filtering the k-clock datasets.

FIG. 4 shows a calibration step or method 420 for determining the passband and center frequency that are applied in the filtering step 432-2 of FIG. 2 that removes the artifacts from the k-clock dataset 146, but maintains the sideband artifacts, of the exemplary k-clock dataset 146 of FIG. 3. This calibration step can be performed by the manufacturer prior to delivery of the OCT system 100, based on known or experimental data obtained from the swept source 102 or output of the interferometer 108, in examples.

Alternatively, an operator may perform the calibration step 420 as part of routine maintenance of the OCT system 100, or in response to changing conditions in the performance of the OCT system 100. Such changes include humidity level variations, and system and component age concerns. Moreover, the OCT system 100 may require calibration associated with each specific application.

The calibration 420 is typically performed in a manual fashion by an operator in response to the current state of the OCT system 100 and the specific tasks or applications for the OCT system 100 to perform. However, it is also possible to perform the calibration step 420 in an automated fashion, through programming of the components of the rendering system 120. Such automatic calibration is performed periodically, in some examples. In other examples, the calibration is initiated in response to image recognition analysis of images generated by the system and specifically the presence of artifacts in those images.

In more detail, in step 422, the operator or the system itself selects a k-clock bandpass window 314, the frequency range or width of which is selected in response to the image artifact requiring suppression, with lower bandpass frequency value $k_{lower}$ 310 and upper bandpass frequency value $k_{upper}$ 312 defining the width. Then, in step 424, the rendering system 120 applies a bandpass filter to the k-clock dataset 146 with bandpass frequency range defined by the k-clock bandpass window 314. This creates a filtered k-clock dataset 146.

According to step 426, the operator then verifies if the desired image artifacts has been removed from the images. If the artifact has not been removed, then the operator or the system in step 428 changes the k-clock bandpass window 314 selection, and transitions to step 422 to repeat the filtering process. Otherwise, the filtering operation is complete in step 430.

The selection of the k-clock bandpass window 314 for spectral filtering of the k-clock dataset 142 impacts the removal of image artifacts from the interference dataset 142 prior to creation of the linearized interference dataset 178. Experimental analysis has shown that optimal selection of the k-clock bandpass window 314 for spectral filtering of the k-clock dataset 140 must narrowly include the frequency values $k_{lower}$ 310 and $k_{upper}$ 312 associated with lower sideband 302, and upper sideband 303, respectively.

Figure 5:
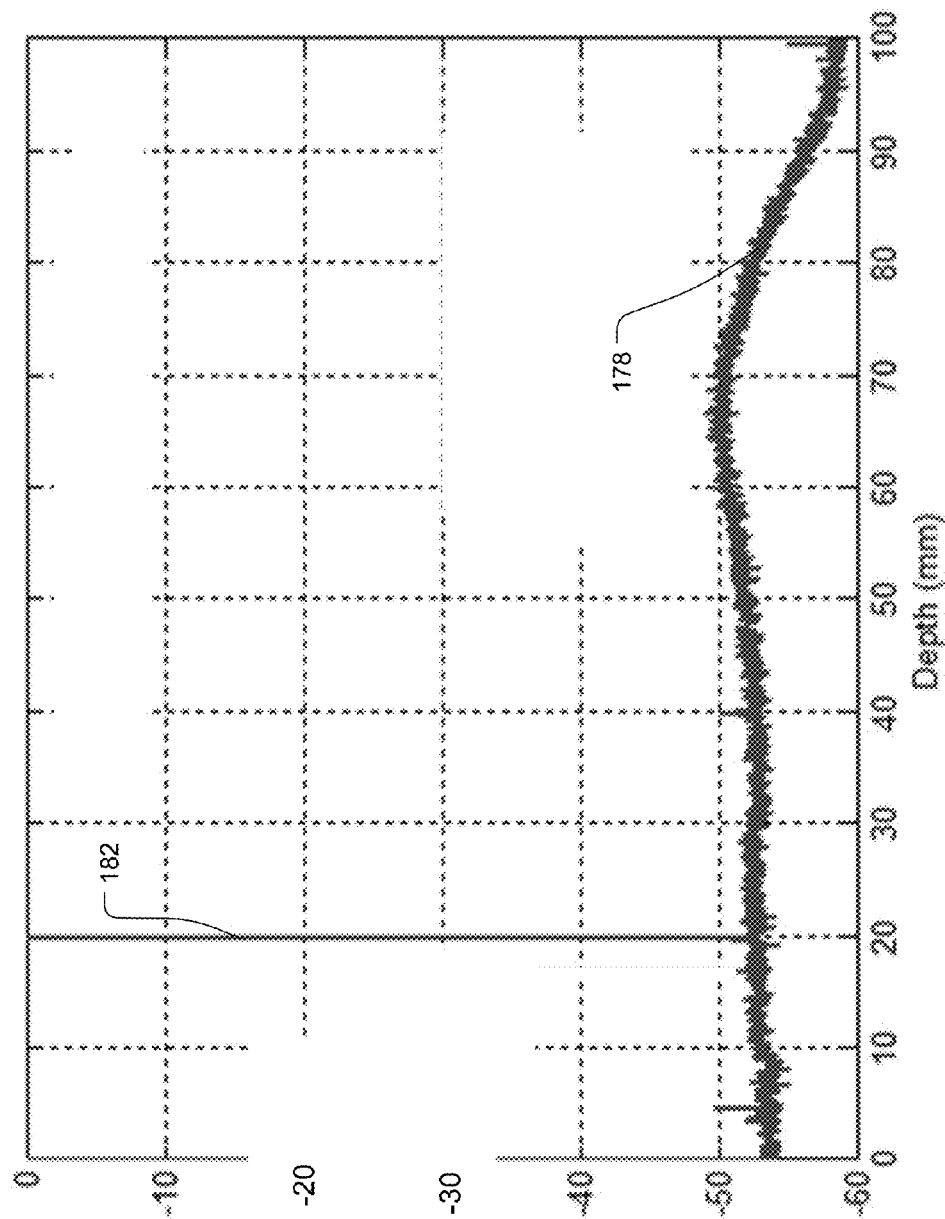
FIG. 5 is an intensity vs. A-scan depth plot of a linearized interference dataset, created by resampling the interference dataset of FIG. 4 using a reconstructed version of the k-clock dataset.

FIG. 5 shows optimal identification and selection of the k-clock bandpass window 314 for removal of sidelobe image artifacts in k-clock dataset 146. It shows a corresponding linearized interference dataset 178, with A-scan peak 182, created using the filtered k-clock dataset 146 of FIG. 4.

Figure 6A:
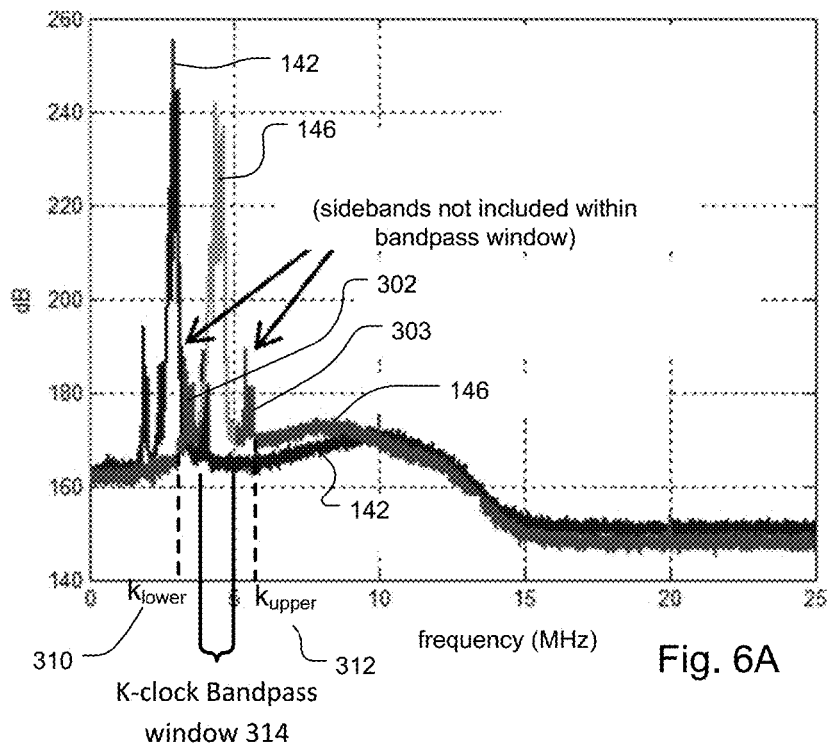
FIG. 6A is an intensity vs. optical frequency plot of a k-clock dataset showing the applied k-clock bandpass window in which the window passband is too narrow.
Figure 7A:
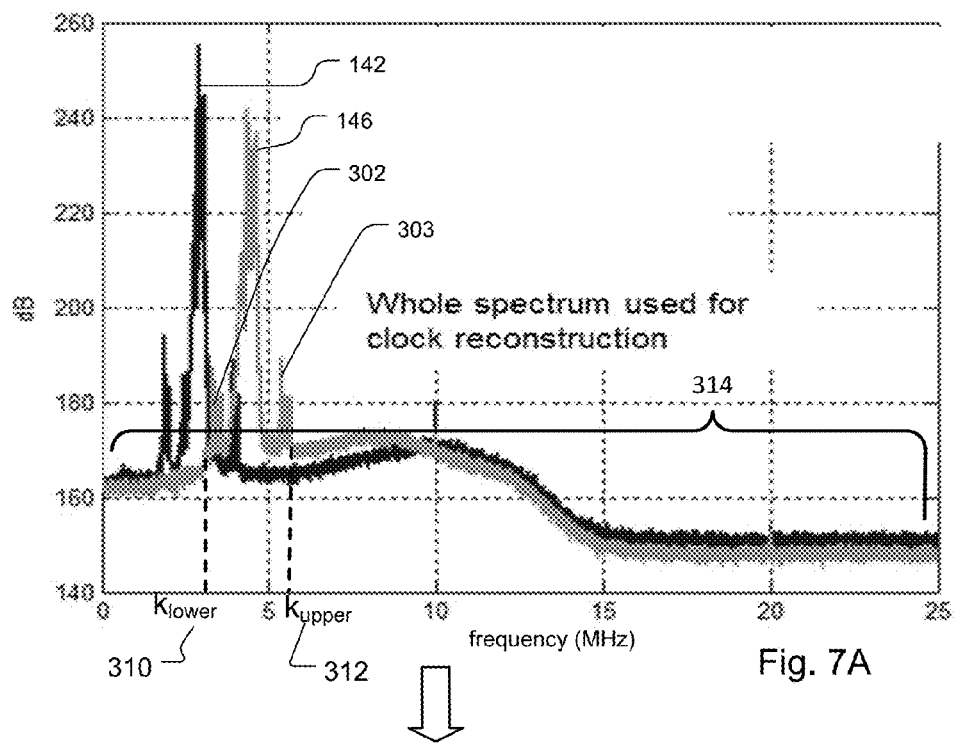
FIG. 7A is an intensity vs. optical frequency plot of a k-clock dataset showing the applied k-clock bandpass window in which the window passband is too wide.

In contrast, FIG. 6A/6B and FIG. 7A/7B illustrate experimental results for filtering sidelobe artifacts of the example in FIG. 3, when the k-clock bandpass window 314 is chosen too narrowly (FIG. 6A), and too broadly (FIG. 7A), respectively.

Figure 6B:
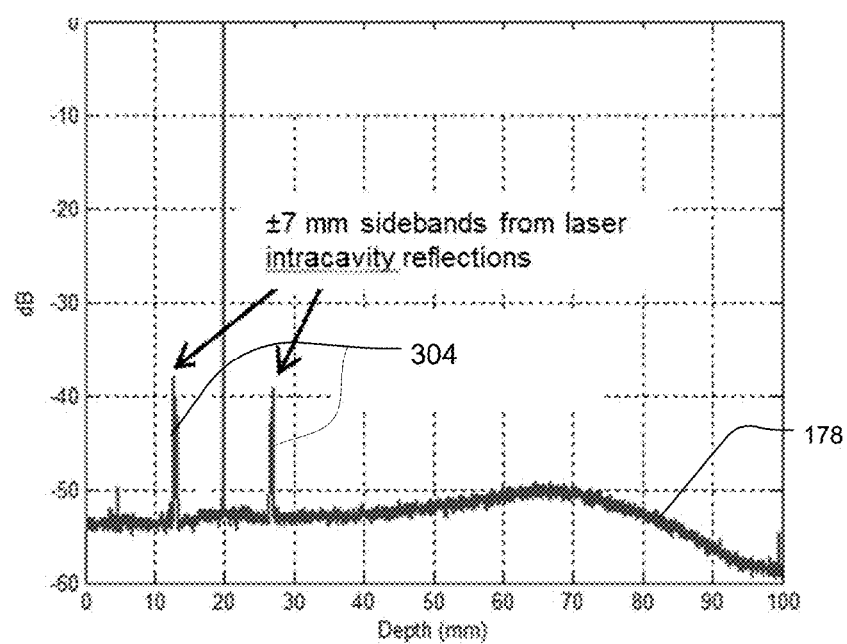
FIG. 6B is an intensity vs. A-scan depth plot of a linearized interference dataset, created by resampling the interference dataset of FIG. 4, using the reconstructed k-clock dataset of FIG. 6A, showing artifacts in the plot.

FIG. 6B shows the linearized interference dataset 178 resampled from its interference dataset 142, using a reconstructed k-clock dataset 176 generated from the too-narrowly selected k-clock bandpass window 314 upon the k-clock dataset 146 of FIG. 6A. Because the frequency values $k_{lower}$ 310 and $k_{upper}$ 312 associated with lower sideband 302 and upper sideband 303 of k-clock dataset 146 were not included in the selection of the k-clock bandpass window 314, interference dataset sidebands 304 appear in the linearized interference dataset 178 of FIG. 6B. The interference dataset sidebands 304 are associated with +−7 mm intracavity reflections within the tuning of the swept source 102 found during experimentation.

FIG. 7A shows the same waveforms as in FIGS. 4 and 6A. In FIG. 7A, the rendering system 120 has included frequency values $k_{lower}$ 310 and $k_{upper}$ 312 associated with lower sideband 302 and upper sideband 303 for the k-clock bandpass window 314. In addition, the operator has selected the k-clock bandpass window 314 to also include the frequency values for the entire frequency range of the scan band.

Figure 7B:
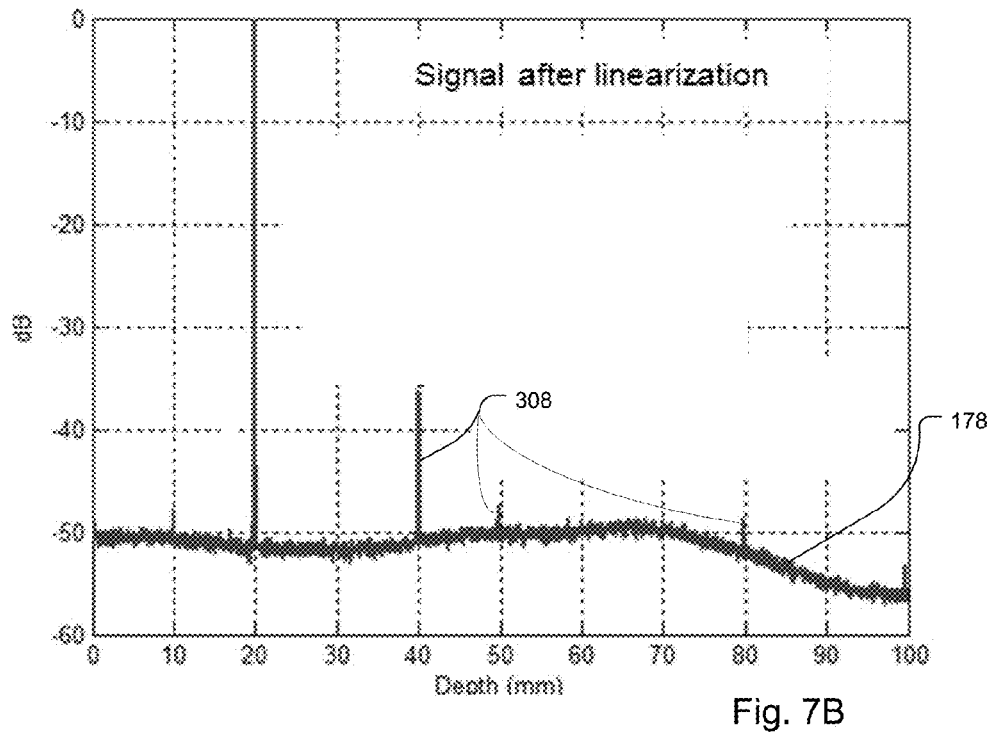
FIG. 7B is an intensity vs. A-scan depth plot of a linearized interference dataset, created by resampling the interference dataset of FIG. 4, using the reconstructed k-clock dataset of FIG. 6A, showing artifacts in the plot.

FIG. 7B shows the linearized interference dataset 178 resampled from its interference dataset 142, using a reconstructed k-clock dataset 176 generated from the too-broadly selected k-clock bandpass window 314 upon the k-clock dataset 146 of FIG. 7A. The linearized interference dataset 174 includes stray peaks 308 not found in the linearized interference datasets 178 of FIG. 5 and FIG. 6B. Experimentation has shown that the stray peaks 308 are most likely associated with high frequency clock noise that has not been "sampled out" of the linearized interference dataset 178 of FIG. 7B, due to the too-broadly selected k-clock bandpass window 314 of FIG. 7A.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical coherence analysis system, comprising:
   an optical swept source system that generates a swept optical signal;
   a k-clock module that generates k-clock signals in response to frequency sweeping of the swept optical signal;
   an interferometer that generates interference signals from the swept optical signal;
   a data acquisition system that samples the k-clock signals and the interference signals to generate a k-clock dataset and an interference dataset; and
   a rendering system that spectrally filters the k-clock dataset into a reconstructed k-clock dataset, and resamples the interference dataset into a linearized interference dataset in response to the reconstructed k-clock dataset.

2. The optical coherence analysis system of claim 1, wherein the rendering system resamples the interference dataset into the linearized interference dataset in response to a reconstructed k-clock dataset.

3. The optical coherence analysis system of claim 1, wherein the rendering system comprises a field-programmable gate array that implements a spectral filter for converting the k-clock dataset into the reconstructed k-clock dataset.

4. The optical coherence analysis system of claim 1, wherein the rendering system identifies tuning jitter artifacts in the k-clock dataset.

5. The optical coherence analysis system of claim 1, wherein the rendering system spectrally filters the k-clock dataset by bandpass filtering the k-clock dataset to suppress artifacts using a k-clock bandpass window for creating the reconstructed k-clock dataset.

6. The optical coherence analysis system of claim 5, wherein the k-clock bandpass window is bounded by a lower frequency value of the k-clock dataset, and an upper frequency value of the k-clock dataset.

7. The optical coherence analysis system of claim 6, wherein the k-clock bandpass window is bounded by a frequency value of a lower sideband of the k-clock dataset, and a frequency value of an upper sideband of the k-clock dataset.

8. The optical coherence analysis system of claim 1, wherein the rendering system spectrally filters the k-clock dataset by:
   performing a Fourier transform upon the k-clock dataset; and
   performing an inverse Fourier transform to create the reconstructed k-clock dataset.

9. The optical coherence analysis system of claim 8, wherein the rendering system applies values of a bandpass function to frequency values outside of a k-clock bandpass filter window prior to performing the inverse Fourier transform.

10. The optical coherence analysis system of claim 9, wherein the rendering system applies zeros to frequency values outside of a k-clock bandpass filter window prior to performing the inverse Fourier transform.

11. The optical coherence analysis system of claim 1, wherein the data acquisition system samples the k-clock signals and the interference signals at a fixed signal sampling rate for generating the k-clock dataset and the interference dataset.

12. The optical coherence analysis system of claim 1, wherein the rendering system comprises a field programmable gate array for creating the linearized interference dataset in response to the reconstructed k-clock dataset.

13. An optical coherence analysis method, comprising:
   generating a swept optical signal;
   generating k-clock signals in response to frequency sweeping of the swept optical signal;
   generating interference signals from the swept optical signal;
   sampling the k-clock signals and the interference signals to generate a k-clock dataset and an interference dataset; and
   spectrally filtering the k-clock dataset into a reconstructed k-clock dataset, and the resampling the interference dataset into a linearized interference dataset in response to the reconstructed k-clock dataset.

14. The optical coherence analysis method of claim 13, further comprising resampling the interference dataset into the linearized interference dataset in response to a reconstructed k-clock dataset.

15. The optical coherence analysis method of claim 13, further comprising applying a spectral filter for converting the k-clock dataset into the reconstructed k-clock dataset.

16. The optical coherence analysis method of claim 13, further comprising preserving tuning jitter information in the reconstructed k-clock dataset.

17. The optical coherence analysis method of claim 13, further comprising spectrally filtering the k-clock dataset by bandpass filtering the k-clock dataset to suppress artifacts using a k-clock bandpass window for creating the reconstructed k-clock dataset.

18. The optical coherence analysis method of claim 17, wherein the k-clock bandpass window is bounded by a lower frequency value of the k-clock dataset, and an upper frequency value of the k-clock dataset.

19. The optical coherence analysis method of claim 17, wherein the k-clock bandpass window is bounded by a frequency value of a lower sideband of the k-clock dataset, and a frequency value of an upper sideband of the k-clock dataset.

20. The optical coherence analysis method of claim 13, further comprising
   performing a Fourier transform upon the k-clock dataset; and
   performing an inverse Fourier transform to create the reconstructed k-clock dataset.

\* \* \* \* \*